(12) United States Patent
Pauzauskie et al.

(10) Patent No.: US 10,479,933 B2
(45) Date of Patent: Nov. 19, 2019

(54) EXTREME SYNTHESIS OF CRYSTALLINE AEROGEL MATERIALS FROM AMORPHOUS AEROGEL PRECURSORS

(71) Applicant: Lawrence Livermore National Security, LLC, Livermore, CA (US)

(72) Inventors: Peter J. Pauzauskie, Oakland, CA (US); Jonathan C. Crowhurst, Livermore, CA (US); Marcus A. Worsley, Hayward, CA (US); Joe H. Satcher, Jr., Patterson, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 362 days.

(21) Appl. No.: 15/595,706

(22) Filed: May 15, 2017

(65) Prior Publication Data
US 2018/0002599 A1    Jan. 4, 2018

Related U.S. Application Data

(62) Division of application No. 12/958,224, filed on Dec. 1, 2010, now abandoned.

(60) Provisional application No. 61/265,638, filed on Dec. 1, 2009.

(51) Int. Cl.
*C09C 1/44* (2006.01)
*C09K 11/65* (2006.01)
*C01B 13/32* (2006.01)
*C01B 33/158* (2006.01)

(52) U.S. Cl.
CPC ............ *C09K 11/65* (2013.01); *C01B 13/322* (2013.01); *C01B 33/1585* (2013.01); *C09C 1/44* (2013.01); *C01P 2002/02* (2013.01); *C01P 2002/72* (2013.01); *C01P 2002/84* (2013.01); *C01P 2004/03* (2013.01); *C01P 2004/04* (2013.01); *C01P 2006/10* (2013.01); *C01P 2006/12* (2013.01)

(58) Field of Classification Search
CPC ..... C01B 33/1585; C01P 2002/02; C09C 1/44
See application file for complete search history.

(56) References Cited

U.S. PATENT DOCUMENTS

| | | | | |
|---|---|---|---|---|
| 2,947,610 A * | 8/1960 | Hall | ......................... | B01J 3/062 423/446 |
| 2005/0152834 A1* | 7/2005 | Tao | ......................... | C01B 39/04 423/700 |
| 2006/0229373 A1* | 10/2006 | Guerra | ........................ | C08J 9/28 521/142 |
| 2007/0167534 A1* | 7/2007 | Coronado | ................... | C08J 9/28 521/64 |
| 2008/0188575 A1* | 8/2008 | Gaspar Martinho | ......................... | B01J 13/0091 516/111 |
| 2010/0290574 A1* | 11/2010 | Hudgins | ................... | H05H 3/06 376/108 |

* cited by examiner

*Primary Examiner* — James Sanders
(74) *Attorney, Agent, or Firm* — Zilka-Kotab (57) ABSTRACT

A method includes positioning a porous structure in a pressure cell; injecting an inert pressure medium within the pressure cell; and pressurizing the pressure cell to a pressure that thermodynamically favors a crystalline phase of the porous structure over an amorphous phase of the porous structure to transition the amorphous phase of the porous structure into the crystalline phase of the porous structure.

12 Claims, 9 Drawing Sheets

EXTREME SYNTHESIS OF CRYSTALLINE AEROGEL MATERIALS FROM AMORPHOUS AEROGEL PRECURSORS

RELATED APPLICATIONS

The present application is a divisional of, and claims priority to, U.S. patent application Ser. No. 12/958,224, filed Dec. 1, 2010, and claims the benefit of priority to a U.S. Provisional Patent Application filed Dec. 1, 2009, under Appl. No. 61/265,638. The contents of each related application is hereby incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to aerogels, and more particularly to extreme synthesis of crystalline aerogel materials from amorphous aerogel precursors.

BACKGROUND

Aerogels are a fascinating class of high surface-area, mechanically-robust materials with a broad range of both commercial and fundamental scientific applications. Owing to its highly porous mass-fractal nanostructure, amorphous silica aerogel has been used as a capture agent in NASA's cometary-dust retrieval missions, to control disorder in $^3$He-superfluid phase transitions, in the fabrication of targets for laser inertial confinement fusion, in low-k microelectromechanical (MEMS) devices, and in Cherenkov nucleonic particle detectors.

In particular, amorphous carbon aerogel has received a considerable amount of attention in recent years owing to its low cost, electrical conductivity, mechanical strength, and thermal stability. Numerous applications have been explored for this material including water desalination, electrochemical supercapacitors, and thermal insulation.

Impressive advances have been made in the synthesis of polycrystalline aerogels through the oxidative aggregation of chalcogenide quantum dots that preserve spectral signatures of quantum confinement. Also, silicon divacancies in nanodiamond have also been shown to be bright single-photon-emitters at room temperature (Jelezko, Phys. Stat. Sol. A, 2006), as well as being photostable near-infrared biocompatible fluorophores (Lu, PNAS, 2007).

Furthermore, recent high-pressure, high temperature (HPHT) experiments with mesoporous silica have been employed to produce mesoporous coesite phase after oxidative removal of the carbon pressure medium. However, the achievement of an amorphous to crystalline phase transition in an aerogel material has remained an outstanding challenge, largely due to the difficulty in preventing pore collapse in the high surface area aerogel starting material.

In addition, thermal, electrical, optical, mechanical, and chemical properties of low-density amorphous aerogels can change profoundly through conversion from an amorphous to a crystalline phase, opening up new horizons for applications of this material in fundamental science.

Therefore, a method and system capable of synthesizing crystalline aerogel materials from amorphous aerogel precursors would have great utility in basic science and commercial applications.

SUMMARY

A method according to one embodiment includes positioning an amorphous porous structure in a pressure cell; injecting an inert pressure medium within the pressure cell; and pressurizing the pressure cell to a pressure that thermodynamically favors a crystalline phase of the porous structure over an amorphous phase of the porous structure to transition the amorphous phase of the porous structure into the crystalline phase of the porous structure.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system includes a pressure cell adapted for enclosing a porous structure; an inert pressure medium within the pressure cell; and a heat source for heating the porous structure.

In another general embodiment, a composition of matter includes a crystalline porous structure having a density of about 30 to about 50 mg/cm$^3$.

In yet another general embodiment, a method includes positioning an amorphous porous structure in a pressure cell; injecting an inert pressure medium within the pressure cell; and pressurizing the pressure cell to a pressure that thermodynamically favors a crystalline phase of the porous structure over an amorphous phase of the porous structure to transition the amorphous porous structure into a crystalline porous structure.

Figure 1A:
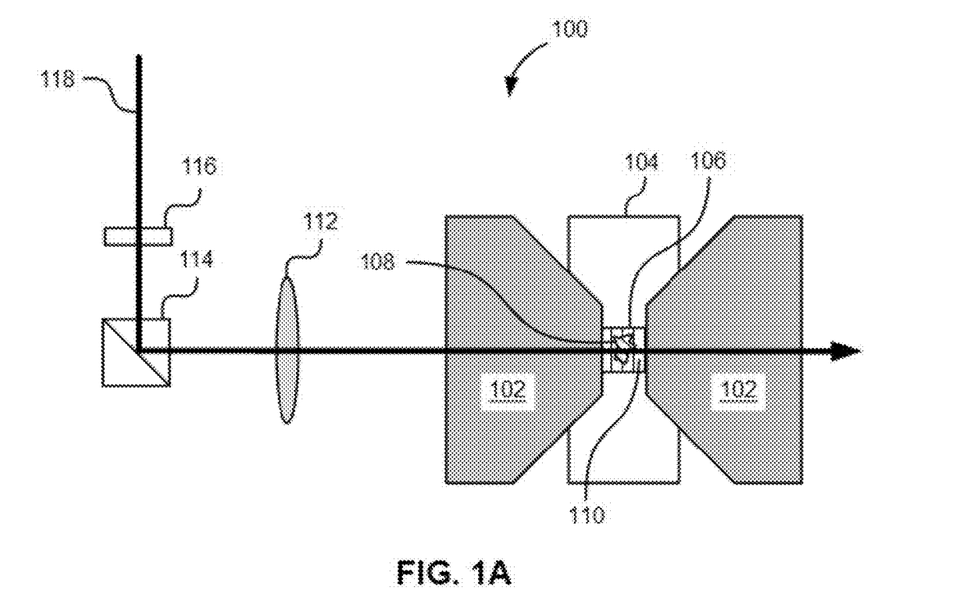
FIG. 1A shows a schematic diagram of an apparatus for extreme synthesis of crystalline aerogel from amorphous aerogel, according to one embodiment.
Figure 1B:
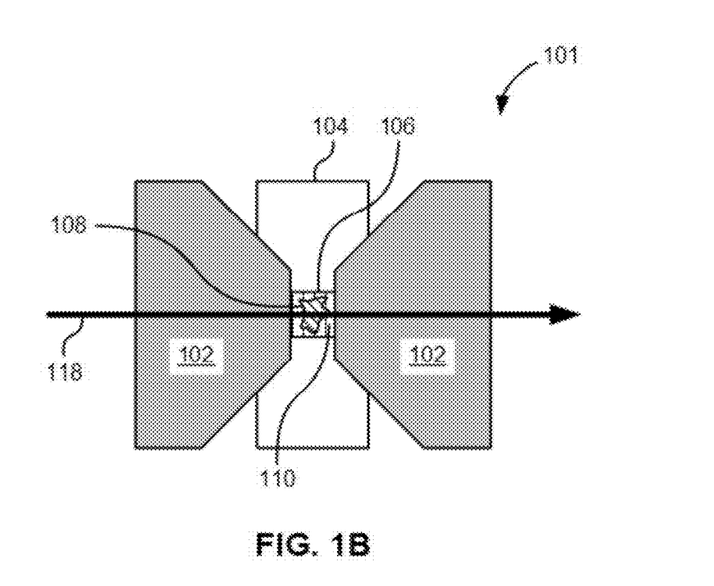
FIG. 1B shows a schematic diagram of a diamond-anvil-cell (DAC), according to one embodiment.

Referring now to the figures, FIG. 1A shows a schematic representation of one exemplary embodiment of an apparatus 100, which includes a diamond anvil cell (DAC) 101, which is also shown separately in FIG. 1B. The DAC 101 includes two diamonds 102 with flat, smooth faces positioned parallel to one another, in flush contact with a metallic gasket 104 so as to form a hollow sample chamber 106. In a preferred embodiment, the DAC 101 may be built with ultralow fluorescence diamonds to allow for optical access through the sample chamber 106.

According to more embodiments, any pressurized chamber capable of maintaining pressures sufficient to transition a porous structure (such as an aerogel) from an amorphous phase to a crystalline phase may be used, such as a piston operated pressure chamber, hydraulic pressure chamber, etc.

In one approach, a porous structure 108, such as an aerogel of carbonized resorcinol-formaldehyde that has a specific density of about 40 mg/cm$^3$, may be loaded into the sample chamber 106. While a carbonized resorcinol-formaldehyde aerogel is employed as the porous structure in a preferred embodiment, any amorphous aerogel or amorphous porous structure, exhibiting appropriate physical properties may be used, as would be understood by one of skill in the art upon reading the present descriptions, for example, aerogels of silica, alumina, titania, etc.

For the sake of clarity and simplicity, for the remainder of this description, the porous structure will be referred to as an aerogel. However, the descriptions and embodiments herein are not meant to be limited to only aerogels, as any suitable porous structures may be used.

The sample chamber 106 is then filled with an inert pressure medium 110. The inert pressure medium 110 conformally and homogeneously occupies a void volume of the sample chamber 106 and the void volume of the pores of the aerogel 108 without disturbing the pore morphology of the aerogel 108, in one embodiment.

According to one exemplary embodiment, the inert pressure medium 110 may be neon. Neon's low critical point (44.4 K, 27.2 atm) and moderate freezing pressure near room-temperature (4.70 Pa at 293 K) permit conformal, homogenous filling of the void volume of the highly-porous carbon aerogel starting material with solid cubic-close-packed (ccp) neon. Furthermore, neon's low chemical reactivity and low photon absorption cross section at 1064 nm reduce undesirable chemical reactions and background absorption during laser heating at high pressure.

The inert pressure medium 110 preferably has low chemical reactivity with the compounds comprising the aerogel 108, as well as a low photon absorption cross section at the operational wavelength and intensity of a heating laser 118. While supercritical neon gas is employed in the exemplary embodiment, any gas exhibiting appropriate physical properties may be used as would be apparent to one of skill in the art upon reading the present descriptions, for example, supercritical argon, helium, krypton, xenon, carbon dioxide, etc.

The aerogel 108 and inert pressure medium 110 are then pressurized in the sample chamber 106, significantly restricting mechanical deformation and atomic diffusion at high pressures and temperatures, in one approach. Further compression ultimately produces pressure conditions that thermodynamically favor a crystalline phase, as opposed to the amorphous phase, of the aerogel 108. The pressure necessary to create conditions that thermodynamically favor a particular compositional state of matter may vary with the physical properties of the aerogel 108 and the desired phase change, and these parameters may generally be inferred from the physical phase diagram of the aerogel material, as would be known by one having ordinary skill in the art.

Once thermodynamically favorable pressure is achieved, kinetic barriers inhibit the amorphous-to-crystalline phase change reaction, in one embodiment. In a preferred approach, applying heat to the pressurized aerogel 108 may facilitate the phase change reaction by providing the atoms comprising the aerogel material with kinetic energy sufficient to overcome the corresponding phase change barrier. Heating may be accomplished via any controlled method as known in the art, and may preferably be homogeneous.

In one exemplary embodiment, a heating laser 118 may be used as a controlled heating source that passes through e.g., a wp filter 116 and is reflected toward the sample chamber 106 by, e.g., a pbc element 114. The laser is focused into the sample chamber 106 with an objective lens 112, and heats the aerogel 108 to a final temperature determined by the aerogel material's optical absorption cross section at the wavelength and intensity of the laser. In a preferred embodiment, controlled application of heat by a laser allows precise control over the spatial sites where phase transition from amorphous to crystalline occur. This allows for a crystalline aerogel to systematically be sculpted from starting amorphous materials.

In one exemplary approach, while converting amorphous-phase carbonized resorcinol-formaldehyde aerogel to a crystalline-phase, an upper limit of the pressure used to create thermodynamically favorable conditions was approximately 21×10$^9$ Pa. Furthermore, heating the carbonized resorcinol-formaldehyde aerogel with an infrared, approximately 100 W continuous Nd:YAG laser operating at 1064 nm and focused onto the sample chamber with a Mitutoyo objective lens having about 50× magnification produced final temperatures above about 500° C.

After completion of the phase-change reaction, pressure and temperature may be reduced to ambient conditions, allowing the inert pressure medium 110 to escape the aerogel 108 by diffusion, possibly with atmospheric air, while maintaining the porosity of the crystalline aerogel 108. This crystalline aerogel 108 may be recovered with standard extraction equipment as known by one having ordinary skill in the art. Properties of the aerogel 108 may be discovered via a suite of techniques including Raman/photoluminescence spectroscopy, time-correlated single photon counting, scanning/transmission electron microscopy imaging, electron diffraction, electron energy loss spectroscopy, and synchrotron scanning transmission x-ray absorption microscopy.

Aerogel Properties

Figure 7:
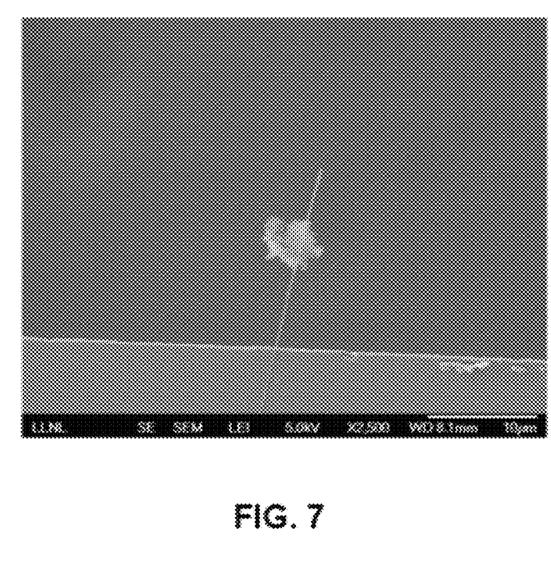
FIG. 7 shows a scanning electron microscopy (SEM) image of a crystalline diamond aerogel, according to one embodiment.

The amorphous carbon aerogel may have a low density of approximately 40 mg/cm$^3$, which is retained in the resulting crystalline diamond aerogel because the inert pressure medium homogeneously and conformally supports each pore within the amorphous structure during phase transition and preserves the three-dimensional structure of the starting material. FIG. 7 shows an SEM image of a crystalline diamond aerogel, according to one embodiment.

The amorphous carbon aerogel strongly absorbs incident energy from the heating laser and is observed to glow while heating. This thermal radiation has been observed to reach a local temperature greater than about 500° C. for a carbon aerogel. As observed by visible microscopy, during heating the resulting material becomes significantly more transparent, scattering rather than absorbing a large amount of incident light.

Figure 2:
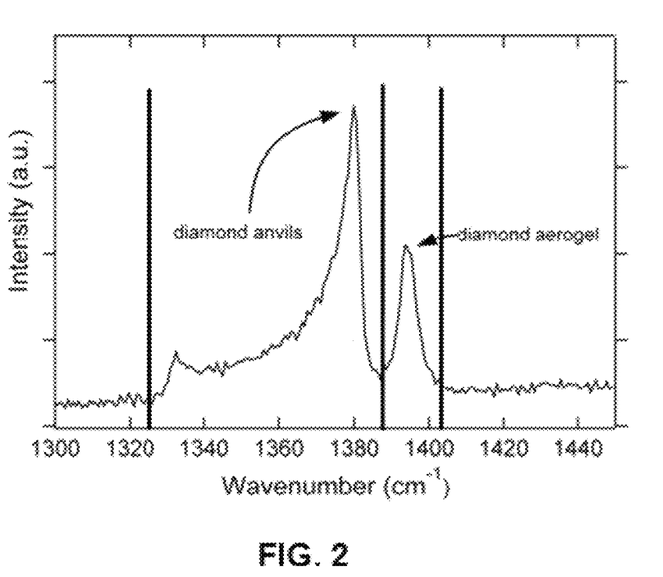
FIG. 2 shows a Raman spectroscopy profile of a crystalline diamond aerogel, according to one embodiment.

Raman spectroscopy was employed to probe this translucent material further resulting in a spectrum as shown in FIG. 2. In contrast with the amorphous carbon aerogel, a sharp new Raman mode is visible in the laser-heated regions with both a frequency and pressure-dependence consistent with a phase transition to crystalline diamond. In particular, while the starting carbon aerogel exhibits sp$^2$ and sp$^3$ bonding and vibrational properties characteristic of graphite, the new Raman mode informs a change in vibrational mode of bonding consistent with inelastic cubic diamond sp$^3$ bonding. Similarly consistent results have been observed in silica-based aerogels, where amorphous starting material exhibits no crystal structure and crystalline aerogel exhibits new vibrational modes consistent with crystalline bonding of the sp$^3$ variety.

Figure 6:
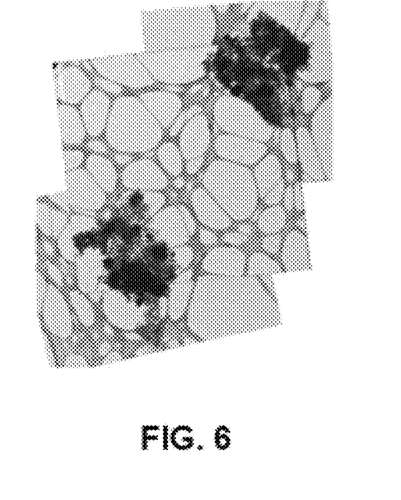
FIG. 6 shows a confocal fluorescence transmission electron microscopy (TEM) image of a crystalline diamond aerogel, according to one embodiment.

Furthermore, intense fluorescence is visible from laser-heat, as shown in FIG. 6, and retained at ambient conditions, suggesting formation of luminescent point defects in the newly formed diamond phase.

In one embodiment, point defects may be controlled by doping the starting aerogel material with an element of interest and subsequently performing the conversion process in order to incorporate desired features into the crystalline aerogel. In one approach, dopants may have optical and/or electrical properties of interest to facilitate downstream applications, for example: fluorophore doping for fluorescent labeling, nitrogen doping for quantum computing, nitrogen doping for optical sensors, etc.

Figure 8:
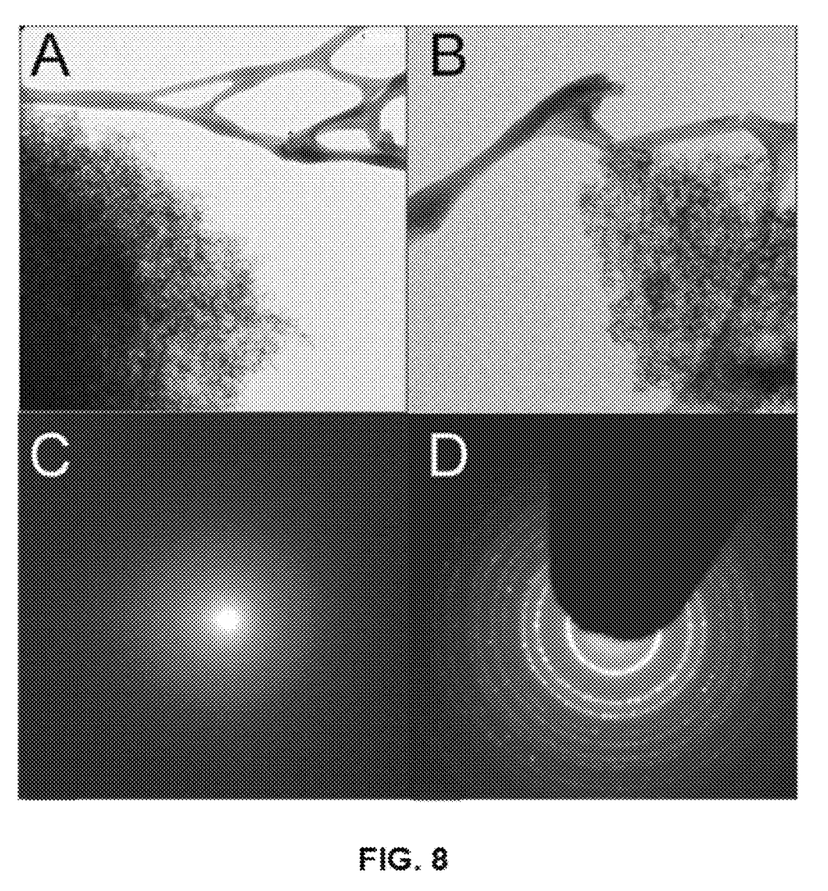
FIG. 8 shows: A) a bright-field TEM image of an amorphous carbon aerogel, according to one embodiment, B) a bright-field TEM image of crystalline diamond aerogel, according to one embodiment, C) an electron diffraction TEM image of an amorphous carbon aerogel, according to one embodiment, and D) an electron diffraction TEM image of crystalline diamond aerogel, according to one embodiment.

Following release of pressure, the material may be recovered from the DAC chamber with motorized probes (such as those from Marzhauser Wetzlar) and prepared for further analysis with transmission electron microscopy (TEM). Low magnification brightfield images (as shown in FIG. 8) reveal similarities in the microstructure between the amorphous carbon starting materials and the recovered diamond aerogel. FIG. 8 shows: A) a bright-field TEM image of an amorphous carbon aerogel, according to one embodiment, B) a bright-field TEM image of crystalline diamond aerogel, according to one embodiment, C) an electron diffraction TEM image of an amorphous carbon aerogel, according to one embodiment, and D) an electron diffraction TEM image of crystalline diamond aerogel, according to one embodiment.

The highly porous aerogel morphology of the starting materials appears well preserved in the recovered material following laser heating at 20 GPa due to support provided from solid neon which is a soft, hydrostatic, and chemically inert pressure medium. Electron diffraction of the starting material shows characteristic amorphous graphitic ring patterns while the recovered material shows several new diffraction rings which can be indexed to the cubic diamond crystal lattice, as shown in FIG. 8.

Figure 10A:
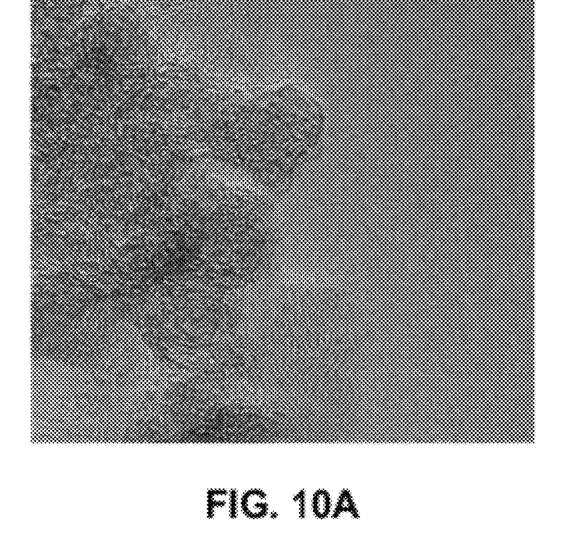
FIG. 10A shows a high-resolution TEM image of an amorphous carbon aerogel, according to one embodiment.
Figure 10B:
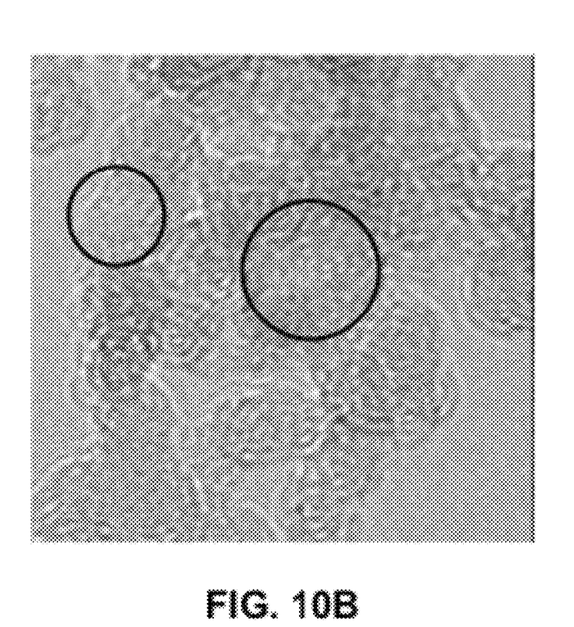
FIG. 10B shows a high-resolution TEM image of a crystalline diamond aerogel, according to one embodiment.

The presence of a new diamond phase is confirmed further through high-resolution TEM images. High-resolution TEM images, shown in FIGS. 10A and 10B, reveal the amorphous starting materials include interconnected graphitic domains with grain sizes less than about 10 nm, as expected for a carbon aerogel and shown in FIG. 10A. In contrast, the recovered diamond aerogel material appears to include ultrananocrystalline grains connected through thin surface coatings of graphitic carbon. Individual grains range in size from about 1 nm to about 100 nm and high-resolution imaging, as shown in FIG. 10B, shows sharp lattice fringes with a d-spacing of about 2.06 Å, corresponding to the (1,1,1) plane of cubic diamond. The diamond grain-size distribution depends largely on the dwell time and intensity of the heating laser used to overcome kinetic barriers to the thermodynamically favorable amorphous-to-diamond phase transition.

Figure 3:
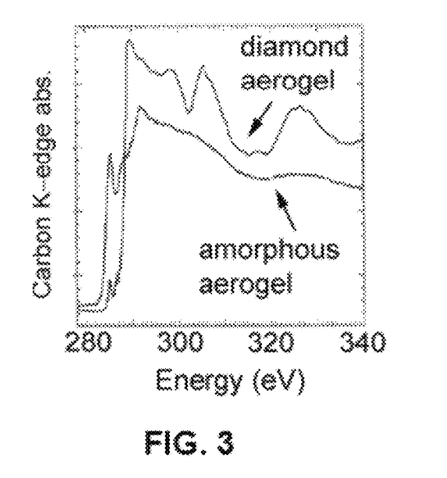
FIG. 3 shows comparative scanning transmission X-ray absorption profiles of an amorphous carbon and a crystalline diamond aerogel, according to one embodiment.

Electron energy loss (EELS) spectra, as shown in FIG. 3, agrees well with this observed microstructure, showing a small graphitic π* antibonding absorption peak at 285.5 eV as well as the characteristic second gap of diamond at 302.5 eV.

Integration of the area under the π* absorption peak indicates greater than 90% phase purity of the crystalline diamond aerogel material. Electron diffraction of the material following x-ray absorption shows that the ultrananocrystalline diamond phase is still present after a 100 meV resolution scanning transmission x-ray absorption microscopy measurement.

Figure 5:
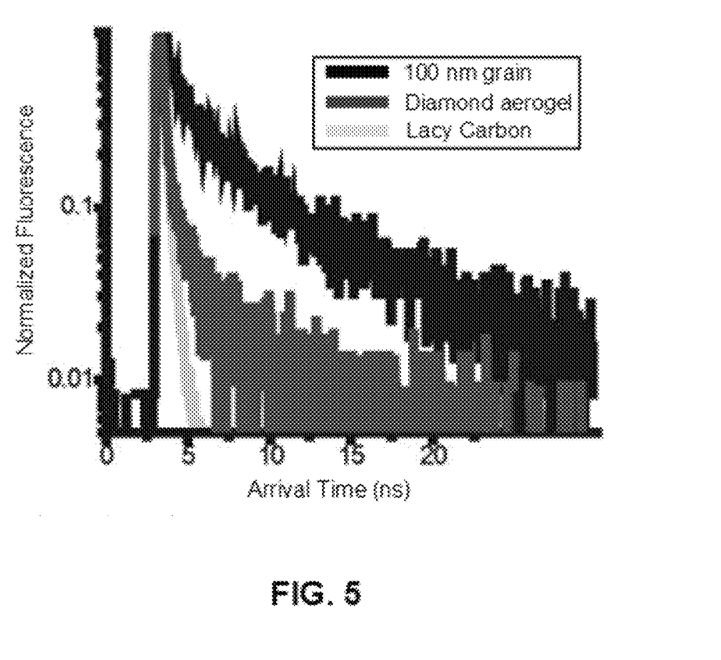
FIG. 5 shows a comparison of time-correlated single photon counting profiles of a 100 nm grain, a crystalline diamond aerogel, and lacy carbon, according to one embodiment.

One dramatic and unanticipated new feature in the recovered diamond aerogel is the presence of extremely bright and photostable luminescence, as observed in time-correlated single photon counting profiles shown in FIG. 5. In one approach, small fragments of recovered material may be supported on either silicon nanowires, lacy-carbon TEM grids, etc., for subsequent optical analysis.

Figure 4A:
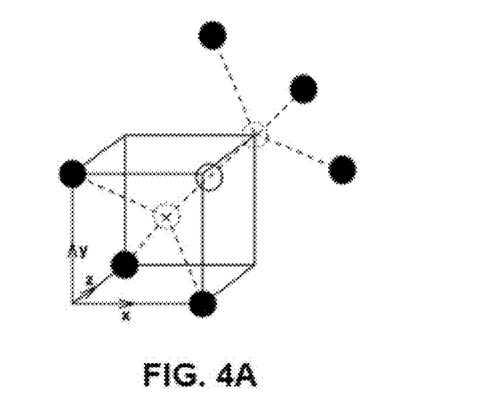
FIG. 4A shows a schematic example of a point vacancy in a crystalline structure, according to one embodiment.
Figure 4B:
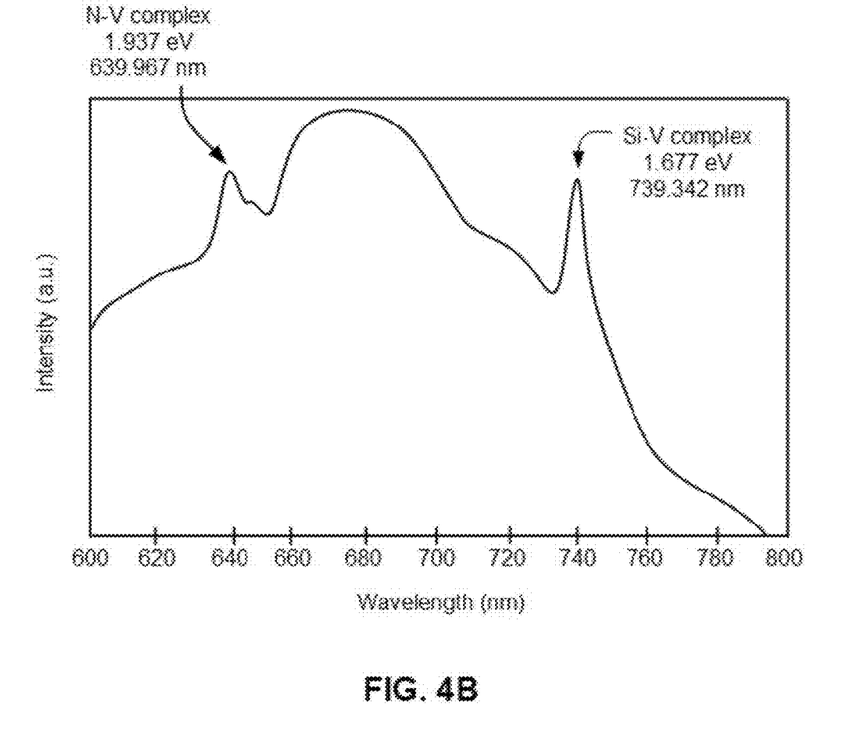
FIG. 4B shows a visible fluorescence profile of point vacancies in a crystalline structure, according to one embodiment.

FIG. 8 shows a bright-field TEM image from a segment of recovered diamond aerogel material that includes several different diamond grain sizes, from about 1 nm to about 100 nm, resulting from different dwell times during laser heating, in image B. The material may be excited with about a 488 nm continuous wave Ar+-ion laser, and the emission may be dispersed with a spectrometer for further analysis. Two sharp spectral features are observed, one at about 639 nm and another at about 739 nm, as shown in FIG. 4B, corresponding to the negatively charged nitrogen vacancy (NV−) and silicon divacancy centers, respectively, as shown in FIG. 4A. The NV− center has been shown to exhibit a fascinating array of properties, including bright, stable single photon emission with long (ms) coherence lifetimes at room temperature, making it a prime candidate for optically addressable quantum bits.

Time-correlated single photon counting may be used to probe the luminescence from this recovered material. Significant differences in luminescence intensity are observed across the material, correlating with grain size, as shown in FIG. 4A. Analysis of the emission lifetime from both large diamond grains and diffuse material shows a characteristic long component of approximately 10 ns corresponding with reports for the NV− center.

In addition, the chemically and physically robust characteristics of diamond enable utilization of materials comprised of crystalline diamond aerogel in a broad range of operational conditions, including extreme temperature and chemical reactivity such as acidity/basicity.

When the crystalline aerogel comprises carbon, it may have characteristics of diamond or graphite, depending on an extent of crystallinity. When the crystalline aerogel comprises silica, it may have characteristics of glass or quartz, depending on an extent of crystallinity. Other aerogel materials may have characteristics of other crystalline structures, as would be apparent to one of skill in the art upon reading the present descriptions.

In one approach, defects within diamond crystals may produce differing emission wavelengths as a function of isotopic identity of the atomic point defect. Taking advantage of this isotopic sensitivity, diamond aerogel may be employed as a detector for isotopic distribution of environmental or experimental samples including, for example, atmospheric and cosmic debris, debris from detonation events, etc.

Figure 9:
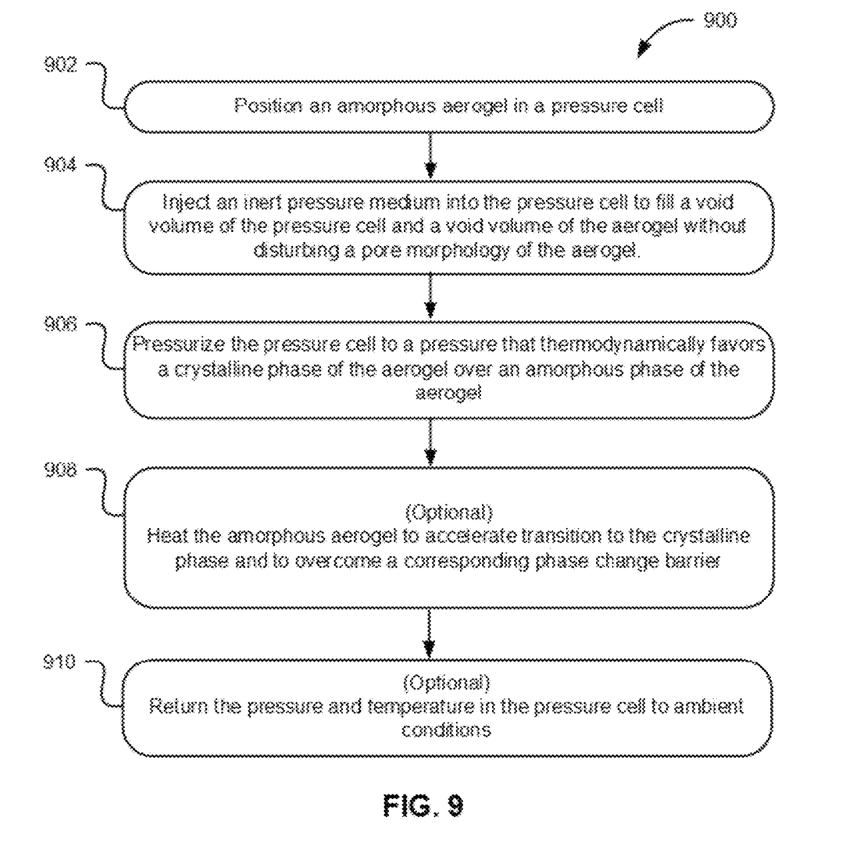
FIG. 9 depicts a method for synthesizing a crystalline diamond aerogel, according to one embodiment.

Now referring to FIG. 9, a method 900 is shown according to one embodiment. The method 900 may be implemented in any desired environment, including those shown in FIGS. 1A-1B, according to various embodiments.

In operation 902, an amorphous aerogel is positioned in a pressure cell. The pressure cell and the amorphous aerogel may be of any type, such as those described previously according to various embodiments.

In operation 904, an inert pressure medium is injected within the pressure cell.

In operation 906, the pressure cell is pressurized to a pressure that thermodynamically favors a crystalline phase of the aerogel over an amorphous phase of the aerogel to transition the amorphous aerogel into a crystalline aerogel.

In optional operation 908, the amorphous aerogel is heated to accelerate transition to the crystalline phase and overcome a corresponding phase change barrier. According to one embodiment, a laser may be selectively applied according to a user-defined pattern to heat one or more selected regions of the amorphous aerogel. This allows for the aerogel to be precisely formed according to a predefined structure, shape, pattern, etc., and sizes, thicknesses, and extent of crystallinity may be controlled.

According to one embodiment, the amorphous aerogel may be heated to a temperature of greater than about 500° C.

In optional operation 910, the pressure and temperature in the pressure cell are returned to ambient conditions, e.g., the conditions in the pressure cell prior to heating and pressurizing, for example, about 25° C. and about 1 atm.

In one approach, the amorphous aerogel may include one of: silica, alumina, titania, and/or combinations thereof, among others.

In another approach, the amorphous aerogel may be an aerogel of carbonized resorcinol-formaldehyde that has a specific density of about 30 to 50 mg/cm$^3$.

In yet another approach, the amorphous aerogel may include carbon and may have a specific density of about 40 mg/cm$^3$.

In a further embodiment, the inert pressure medium may conformally and homogeneously occupy a void volume of the pressure cell and a void volume of pores of the amorphous aerogel without disturbing pore morphology of the amorphous aerogel. This allows the aerogel to maintain its shape through the transition from amorphous to crystalline.

According to another embodiment, the pressure cell may be pressurized to a pressure of about $21 \times 10^9$ Pa, when the amorphous aerogel includes an amorphous-phase carbonized resorcinol-formaldehyde aerogel. Other pressures may be used that correspond to other aerogel materials as would be apparent to one of skill in the art upon reading the present descriptions.

In another approach, the inert pressure medium may include at least one of: neon gas, argon gas, helium gas, krypton gas, xenon gas, carbon dioxide gas, and mixtures thereof, among others.

The methods and embodiments described herein may be extended to produce unknown crystalline aerogel materials with previously unachievable phases with relevance towards discovery-class fundamental science targeted at new materials with enhanced energy conversion or storage capacities. The fabrication of diamond aerogel thin films could find potential use in high-current field emission applications, among others.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    positioning a porous structure in a pressure cell;
    injecting an inert pressure medium within the pressure cell; and
    pressurizing the pressure cell to a pressure that thermodynamically favors a crystalline phase of the porous structure over an amorphous phase of the porous structure to transition the amorphous phase of the porous structure into the crystalline phase of the porous structure.

2. The method as recited in claim 1, further comprising heating at least the amorphous phase of the porous structure to accelerate transition to the crystalline phase and to overcome a corresponding phase change barrier.

3. The method as recited in claim 2, wherein a laser is selectively applied according to a user-defined pattern to heat one or more selected regions of the amorphous phase of the porous structure.

4. The method as recited in claim 2, wherein the amorphous phase of the porous structure is heated to a temperature of greater than about 500° C.

5. The method as recited in claim 1, further comprising returning the pressure and temperature in the pressure cell to ambient conditions.

6. The method as recited in claim 1, wherein the amorphous phase of the porous structure comprises one of: silica aerogel, alumina aerogel, and titania aerogel.

7. The method as recited in claim 1, wherein the amorphous phase of the porous structure is an aerogel of carbonized resorcinol-formaldehyde that has a specific density of about 30 to 50 mg/cm$^3$.

8. The method as recited in claim 1, wherein the amorphous phase of the porous structure comprises carbon aerogel and has a specific density of about 40 mg/cm$^3$.

9. The method as recited in claim 1, wherein the inert pressure medium conformally and homogeneously occupies a void volume of the pressure cell and a void volume of pores of the amorphous phase of the porous structure without disturbing pore morphology of the amorphous phase of the porous structure.

10. The method as recited in claim 1, wherein the pressure cell is pressurized to a pressure of about $21 \times 10^9$ Pa, wherein the amorphous phase of the porous structure comprises an amorphous-phase carbonized resorcinol-formaldehyde aerogel.

11. The method as recited in claim 1, wherein the inert pressure medium comprises at least one of: neon gas, argon gas, helium gas, krypton gas, xenon gas, and carbon dioxide gas.

12. The method as recited in claim 11, wherein the inert pressure medium comprises supercritical neon gas.

* * * * *